F. PERKINS.
DEVICE FOR DETACHMENT OF RIMS FROM TIRES.
APPLICATION FILED SEPT. 25, 1914.
1,140,315. Patented May 18, 1915.
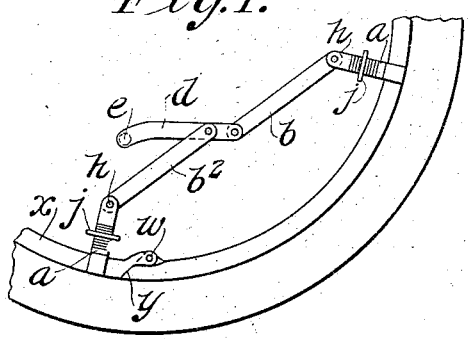
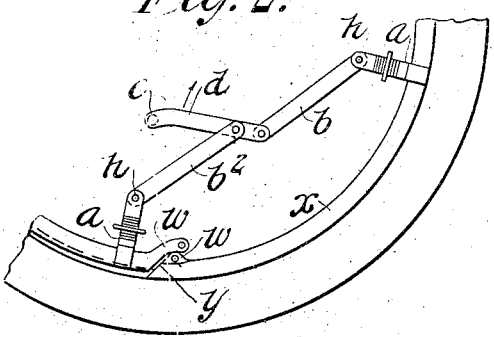
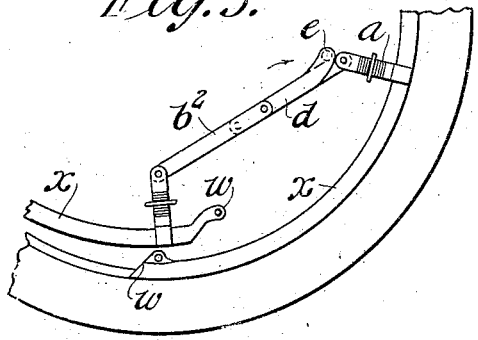
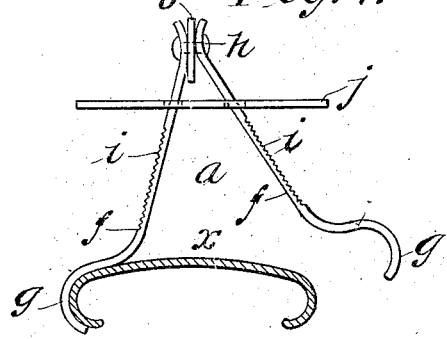
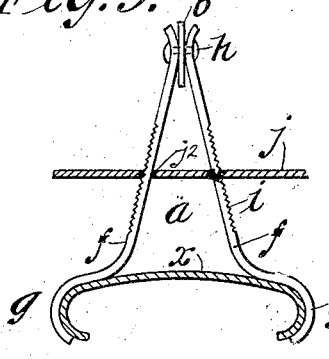
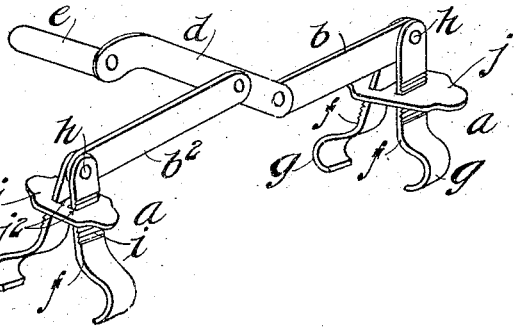
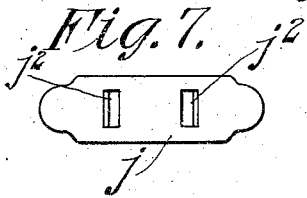
WITNESSES:
W. P. Noble.
R. M. Mowry.
INVENTOR.
Fred Perkins,
BY
ATTORNEY.

UNITED STATES PATENT OFFICE.

FRED PERKINS, OF WARREN, MASSACHUSETTS, ASSIGNOR TO GEORGIA W. PERKINS, OF WARREN, MASSACHUSETTS.

DEVICE FOR DETACHMENT OF RIMS FROM TIRES.

1,140,315.  Specification of Letters Patent. Patented May 18, 1915.

Application filed September 25, 1914. Serial No. 863,593.

*To all whom it may concern:*

Be it known that I, FRED PERKINS, a citizen of the United States of America, and resident of Warren, in the county of Worcester and State of Massachusetts, have invented certain new and useful Improvements in Devices for Detachment of Rims From Tires, of which the following is a full, clear, and exact description.

This invention relates to improvements in a device for employment in connection with demountable rims for automobile wheels for effecting the disengagement of the tire or tire shoe from the rim or the reëngagement of the rim with the tire thereon to its normal position.

The device is especially designed for employment in conjunction with a demountable rim of the kind known as the "quick detachable" and which rim is characterized by the making of such rim transversely split at one point in its circumferential length (with fastening devices for the ends of the rim at the location of the cleft) so that, when the ends are unfastened, by the exertion of force in the proper direction the rim may have a portion inwardly or diametrically contracted so that the tire shoe may be easily detached from the rim.

One object of the present invention is to provide a device of simple and improved construction which is effective, in a quick and convenient manner, for securing a detachment of the rim from its engagement with the tire and is also operable for as quickly and readily bringing the rim, after a tire has been engaged therewith, to its expanded position, in which it is to be locked or secured.

Another object of the invention is to provide clamps included as part of the rim disengaging device which are of novel and improved construction and adapted for engagement with rims of different widths.

The invention is described in conjunction with the accompanying drawings and is set forth in the claims.

In the drawings—Figure 1 is a side view of a demountable rim in its normal or expanded position for the retention of the tire which is indicated as interlocked therewith, and representing the rim detaching device as applied in readiness for the detaching operation. Figs. 2 and 3 are similar views showing the initial and completed stages of the detaching operation. Figs. 4 and 5 are transverse sectional views, on a larger scale, through one of the duplicated clamps as taken on line 4—4, Fig. 1. Fig. 6 is a perspective view of the improved device. Fig. 7 is a plan view of the clamp operating plate, in detail.

The rim $x$ of the kind somewhat extensively used, and known as the "quick detachable" is transversely split as indicated at $y$, so that such rim is completely severed in one point of its circumferential length and so that a portion of the length thereof may be contracted from its position conforming to the complete circular contour, represented in Fig. 1 to that represented in Fig. 3,—the rim having transversely perforated ears or lugs $w$ $w$ whereby, by a locking pin, the rim ends may be detachably secured.

The device in which the present invention resides consists of duplicated clamps $a$ $a$, links $b$ and $b^2$, each by one end thereof pivotally connected to one of the clamps $a$, and a lever $d$ having one end thereof pivotally connected to the link $b$ and to which adjacent its point of pivotal connection with link $b$, it has pivotal connection with the link $b^2$,—said lever, moreover, having at its free end a transversely extended handle $e$.

Each clamp $a$ consists of a pair of opposed members $f$ $f$ composed of flat thin metal, the upper portions of which are upwardly and convergently arranged relative to each other while the outwardly extended lower extremities $g$ $g$ are curved as shown to embrace and engage the opposite sides of the rim $x$. The members $f$ $f$ of both of the clamps are by the pivots $h$ connected to the outer ends of the links $b$ and $b^2$.

The upwardly convergent portions of the clamp members $f$ $f$ have serrations $i$ $i$ on their outer surfaces, and these serrated members are embraced by centrally apertured clamp operating plates $j$, $j$ in such manner that by the downward forcing of the plates the opposite margins of the apertures cause the inward forcing or contraction of the members for tightly gripping the rim at the opposite sides thereof,—all as will be perfectly understood by comparison of Figs. 4 and 5.

When it is desired to effect the disengagement between the rim and tire, the device is applied with the toggle-like members $b$, $b^2$ in their more or less distended relations (Fig. 1), the clamps $a$ $a$ being gripped to the rim. By then swinging the lever $d$ in the direction of the arrows, Figs. 2 and 3, the action is to secure the disposition of the parts so that the different stages of the rim contraction are successively acquired as shown in the last named figures.

The device, when the parts thereof are brought to the relations represented in Fig. 3, is self-retaining of the relations and conditions there shown, requiring no effort or attention on the part of the operator who is then free to manipulate the tire for its detachment from the rim. And, manifestly, the reversal of the movements of the parts from those required for the contraction of the rim is effective, after an original or a replaced tire has been engaged with the contracted rim, for bringing the rim to its expanded position in true circular contour whereby it may be fastened by the locking pin inserted through the perforated lugs $w$ $w$.

Each plate $j$ is made with separated slots or apertures $j^2$, $j^2$, so that each clamp member $f$ is individually engaged, such plate being effective for maintaining the clamp members in their proper relations. The outer margins of the apertures $j^2$ are of V-shape for engagement in the serrations $i$ of the members $f$.

I claim:—

1. In a device for detaching rims from tires, the combination with a pair of clamps adapted for engagement with a split rim at points on opposite sides of the cleft, links pivotally connected to the clamps, and a lever having an end portion thereof pivotally connected to one of the links and to which the end of the other link is pivotally connected.

2. In a device for detaching rims from tires, the combination with a duplicated pair of clamps, each comprising resilient flat metal members formed with upper portions convergently arranged and outwardly extended portions terminating in curved extremities adapted to engage the opposite sides of the rim, links pivotally connected to the upwardly convergently arranged portions of said members, a lever having the end thereof pivotally connected to one of the links and to which the end of the other link is pivotally connected, and means for causing the transverse contraction of said members.

3. In a device for detaching rims from tires, the combination with a duplicated pair of clamps, each comprising resilient flat metal members formed with upper portions convergently arranged and outwardly extended portions terminating in curved extremities adapted to engage the opposite sides of the rim, links pivotally connected to the upwardly convergently arranged portions of said members, a lever having the end thereof pivotally connected to one of the links and to which the end of the other link is pivotally connected, and an apertured plate embracing convergent portions of said members and adapted, upon being forced downwardly, to contract same for their clamping engagement with the rim.

4. In a device for detaching rims from tires, the combination with a duplicated pair of clamps, each comprising resilient flat metal members formed with upper portions convergently arranged and outwardly extended portions terminating in curved extremities adapted to engage the opposite sides of the rim, and having serrations on their outer sides, links pivotally connected to the upwardly convergently arranged portions of said members, a lever having the end thereof pivotally connected to one of the links and to which the end of the other link is pivotally connected, and a plate provided with separate apertures, and having its separately apertured portions in embracing engagements about said clamp members, the outer margins of said apertures being of V-shape for engagement in said serrations.

Signed by me at Warren, Mass., in presence of two subscribing witnesses.

FRED PERKINS.

Witnesses:
B. D. PERKINS,
S. R. McCONISON.